United States Patent Office 3,085,937
Patented Apr. 16, 1963

3,085,937
METHOD OF COMBATING COCCIDIOSIS WITH SULFONAMIDE COMPOSITIONS
Hisao Hirayama, Nishinomiya-shi, Hyogo Prefecture, Japan, assignor to Shionogi & Co., Ltd., Osaka-shi, Japan
No Drawing. Filed Feb. 6, 1961, Ser. No. 87,076
Claims priority, application Japan Nov. 21, 1960
3 Claims. (Cl. 167—53.1)

This invention relates to the prophylaxis and the treatment of coccidiosis. More particularly, it is concerned with novel compositions useful in the prophylaxis and the treatment of coccidiosis which contain 3-sulfanilamido-5-methylisoxazole or a metal salt thereof as the active ingredient.

The widespread poultry disease complex commonly called "coccidiosis" is caused by several species of protozoan parasites of the genus Eimeria of the order Coccidia. Thus the species *E. tenella* is responsible for a severe and frequently fatal infection in the cecum, or blind gut, of chickens. Further, other species of Eimeria and particularly *E. acervulina, E. necatrix, E. maxima* and *E. brunetti* cause serious intestinal infections in poultry. When left untreated coccidiosis causes extensive losses to chicken raisers. Accordingly, the control of coccidiosis is essential to successful poultry raising.

Therefore one object of this invention is to prevent the development and spread of coccidiosis. Another object is to provide novel compositions which can be used to control coccidiosis.

In accordance with the present invention, compositions comprising 3-sulfanilamido-5-methylisoxazole or a metal salt thereof represented by the following formula:

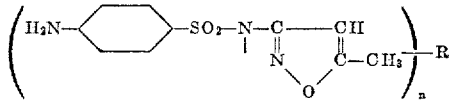

wherein R represents a hydrogen, an alkali metal or an alkaline earth metal and $n$ represents a number not more than 2, combined with an inert carrier, have been found effective when administered to poultry, to prevent the development and spread of coccidiosis.

3-sulfanilamido-5-methylisoxazole is a known sulfonamide, which has long-acting and broad antibacterial properties for humans, and which is described in U.S. Patent 2,888,455.

The novel composition of this invention comprises 3-sulfanilamido-5-methylisoxazole or a metal salt thereof combined with an inert carrier or diluent. Such a composition is conveniently produced by intimately dispersing the active ingredient throughout a carrier.

The active ingredient may be 3-sulfanilamido-5-methylisoxazole or a metal salt thereof. As metal salts are exampled alkali metals such as sodium and potassium, alkaline earth metals such as calcium and barium and the like. Those metal salts can be readily prepared from 3-sulfanilamido-5-methylisoxazole according to the usual method. For instance, the alkali metal salts can be prepared by dissolving 3-sulfanilamido-5-methylisoxazole in equimolar alkali hydroxide solutions and evaporating water from the resulting solution. As the alkali metal salts are very soluble in water, they are suitable for the preparation of liquid dispersions. Of course, the present invention is not limited to the use of the metal salts exampled above. It is especially desired and intended to include the use of any other metal salts which are substantially as active as 3-sulfanilamido-5-methylisoxazole.

The carrier or diluent may be either liquid or solid. Liquid dispersions can be prepared by using water or vegetable oil and satisfactorily by using emulsifiers and surface active agents. Any solid can be used as a carrier which is inert to the active compound and which can be administered to animals with safety. Many different solid materials will function as suitable carriers but those which are inexpensive and readily available are preferred. Some such suitable carriers are ground oyster shells, edible vegetable materials such as commercial animal and poultry feeds, urea, corn meal, ground corn, citrus meal, fermentation residues and distillers dried grains. The active ingredient is conveniently dispersed in a solid carrier by usual methods such as stirring, tumbling and grinding. In this manner, by selecting different carriers and by altering the ratio of carrier to the active ingredient, compositions of varying concentration can be prepared.

Premixes may be prepared in the same general manner. Premixes contain the active ingredients in a carrier, but in a greater concentration than is used in the poultry feed. A premix is a convenient manner of supplying the composition to the poultry raiser, who further dilutes the concentration of the active composition by mixing the premix with the poultry feed. Such as sodium bicarbonate, lactose and talcum powder can be preferably used for the carrier of premixes.

The amounts of the active ingredient required for the effective therapeutic control of coccidiosis are associated with the kinds of animals that are treated. With regard to poultry, good results have been obtained by the administration of a quantity of the active ingredient equal to from about 0.05% to about 2.0% of the food consumed and also good results have been obtained for prophylactic control from about 0.005% to about 0.05%.

Premixes contain from about 5% to about 50% of 3-sulfanilamido-5-methylisoxazole or a metal salt thereof dispersed in an inert carrier.

The coccidiostatic activity of 3-sulfanilamido-5-methylisoxazole was experimentally demonstrated according to the following tests:

118 White Leghorn male chickens of 17 days old were divided into 6 groups. Of these 6 groups, five groups were inoculated with 80,000 sporulated oocysts of *Eimeria tenella* by feeding the poultry feed containing them and the remaining one group served as the uninfected and unmedicated control group. Beginning with 48 hours after infection, the infected groups, except the one group serving as the unmedicated control, were daily administered the various doses of drugs. Namely, each group was medicated with 0.2%, 0.1% or 0.05% aqueous solution of sodium salt of 3-sulfanilamido-5-methylisoxazole or 0.2% aqueous solution of sodium salt of sulfamerazine as drinking water. The experiment lasted through 10 days and appearances of health condition, mortality, increasing rates of body weight, excrements and oocyst count in feces were observed. Also, the autopsy findings of 5 chickens, which were picked up at random from the surviving birds of every 6 groups (total 30 birds), and the infection of oocysts in the blind gut were observed at the end of the test.

The results were as follows:

The above results clearly indicate that 3-sulfanilamido-5-methylisoxazole has very low toxicity for poultry and that there is a large difference between therapeutic doses

TABLE I

| Group No. (number of birds) | | Days after infection | | | | | | | | Oocysts in the blind gut of 5 surviving birds | Percent weight gain of surviving birds |
|---|---|---|---|---|---|---|---|---|---|---|---|
| | | 3 | 4 | 5 | 6 | 7 | 8 | 9 | 10 | | |
| | | Age of birds, in days | | | | | | | | | |
| | | 20 | 21 | 22 | 23 | 24 | 25 | 26 | 27 | | |
| I (18) | Hemafecia | − | ± | + | +++ | + | ± | − | − | All (−) | 206 |
| | Oocysts in fecia | − | − | − | − | ± | − | − | − | | |
| | Death | | | | 2 | 1 | | | | | |
| II (20) | Hemafecia | − | ± | ++ | +++ | + | − | − | − | 1 bird (++), 4 birds (−) | 163 |
| | Oocysts in fecia | − | − | − | − | + | ± | − | − | | |
| | Death | | | | 4 | 1 | | | | | |
| III (20) | Hemafecia | − | ± | ++ | +++ | + | − | − | − | 2 birds (+++), 2 birds (+), 1 bird (±) | 180 |
| | Oocysts in fecia | − | − | − | − | + | + | ± | ± | | |
| | Death | | | | 3 | | | | | | |
| IV (21) | Hemafecia | − | ± | ++ | +++ | + | − | − | − | 2 birds (++), 3 birds (−) | 167 |
| | Oocysts in fecia | − | − | − | − | − | − | − | − | | |
| | Death | | | | 3 | | 1 | | | | |
| V (20) | Hemafecia | − | ± | +++ | +++ | ++ | − | − | − | 4 birds (+++), 1 bird (++) | 154 |
| | Oocysts in fecia | − | − | ± | ± | + | ++ | ++ | ++ | | |
| | Death | | | | 10 | | | | | | |
| VI (19) | Hemafecia | − | − | − | − | − | − | − | − | | 218 |
| | Oocysts in fecia | − | − | − | − | − | − | − | − | | |
| | Death | | | | | | | | | | |

NOTE.—Group I, 0.2% sodium salt of 3-sulfanilamido-5-methylisoxazole. Group II, 0.1% sodium salt of 3-sulfanilamido-5-methylisoxazole. Group III, 0.05% sodium salt of 3-sulfanilamido-5-methylisoxazole. Group IV, 0.2% sodium salt of sulfamerazine. Group V, infected but unmedicated. Group VI, uninfected and unmedicated. All the birds of group IV had diarrhea on the 3d day and some of them were dead of intoxication on the 4th day of the medication. Thereafter the medication was stopped.

In Table I, with reference to "Hemafecia," the minus (−) sign indicates "no hemafeces observed," whereas each plus (+) sign indicates the presence of a quantity of hemafeces. Thus ++ represents twice the quantity of hemafeces as +, while ± represents the minimum positive presence of hemafeces. With reference to oocysts, (−) indicates "no oocysts observed," and each (+) represents the presence of a quantity of oocysts.

The natural therapeutic experiment using the active ingredient of this invention on about 100 coccidiosis-infected birds in a domestic poultry-yard, was held in August 1960. Namely, the infected birds were daily medicated with 0.2% or 0.1% of 3-sulfanilamido-5-methylisoxazole mixed in feeds for 10 days. The results showed that diarrhea stopped on the 2nd day and hemafeces diminished on the 4th or 5th day of the medication, and appetites restored as usual, wasted birds decreased and the deaths were not observed.

The acute toxicity-test of this active ingredient was applied to 70 sound White Leghorn male chickens, 13 days old, during 13 days. The groups of 10 birds each were fed with a feed containing from 0.32% to 10% of sodium salt of 3-sulfanilamido-5-methylisoxazole uniformly dispersed therein. The results are shown in Table II.

and toxic doses. This fact shows that the active ingredient of the present invention is the drug for coccidiosis superior to the other known drugs. For example, the toxicity trials of sulfaquinoxaline which is a well-known sulfa-drug useful against coccidiosis are shown as follows: Newly hatched White Leghorn chickens were fed 0.1% and 0.3% sulfaquinoxaline in the mash for 10 and 30 days, respectively. It was seen that 0.1% sulfaquinoxaline in the mash for 10 days exhibited little influences and up to 30 days depressed growth rate. However, 0.3% of the drug in the mash severely depressed growth rate and definitely was within the toxic range, since 21% of mortality was seen when so treated for 30 days, and many of the survivals were badly stunted. So, it is seen that sulfaquinoxaline has higher toxicity and very narrower difference between therapeutic doses and toxic doses than that of the active ingredient of the present invention.

The following examples are given solely for the purpose of illustration and are not to be construed as limitations of this invention, many variations of which are possible.

*Example 1*

To prepare 1,000 g. of premix, 100 g. of sodium salt of

TABLE II

| Group No. (number of birds) | Percent of ingredient in feed | Death | Activity | Condition of eating | Excrement | Percent weight gain of survived birds |
|---|---|---|---|---|---|---|
| I (10) | 10 | 3 birds on the 7th day, 1 bird on the 8th day. | Melancholy | Left by ½ to ¼ | White and watery | 179 |
| II (10) | 5 | | do | do | do | 152 |
| III (10) | 2.5 | | A little melancholy | Left by ⅕ to ½₀ | A little soft | 200 |
| IV (10) | 1.25 | | Normal | Time of eating, a little delayed | Normal | 225 |
| V (10) | 0.63 | | do | do | do | 252 |
| VI (10) | 0.32 | | do | Normal | do | 251 |
| VII (10) | Control | | do | do | do | 284 |

In Table II, the minus (−) sign under the heading "Death" indicates no death observed.

3-sulfanilamido-5-methylisoxazole, 400 g. of sodium bicarbonate and 500 g. of lactose are mixed.

The 1,000 g. of premix are mixed and stirred thoroughly with vegetables, complex feeds and water to make 100 kg. as a whole (concentration of active ingredient, 0.1%) and the resulting feeds may be given to infected chickens 5 times a day.

*Example 2*

To prepare a lot of active drinking water for about 1,000 chickens, 50 g. of sodium salt of 3-sulfanilamido-5-methylisoxazole are dissolved in 100 l. of water (concentration of active ingredient, 0.05%).

As average daily requirement of drinking water for a chicken is thought to be about 60 to 150 cc., the 100 l. of active drinking water are available for prophylactic use for about 1,000 chickens.

Having thus described the subject matter of my invention, what it is desired to secure by Letters Patent is:

1. The method of combating coccidiosis in coccidiosis infected poultry which comprises administering to the poultry a compound of the formula

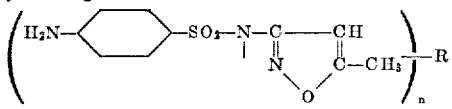

wherein R is a member selected from the group consisting of H, alkali metal and alkaline earth metal, and $n$ is a whole number of not more than 2 and corresponding to the valence of R, in an amount of about 0.05% to about 2.0% by weight of the food consumed by the poultry.

2. The method according to claim 1, wherein the said compound is 3-sulfanilamido-5-methylisoxazole.

3. The method according to claim 1, wherein the said compound is the sodium salt of 3-sulfanilamido-5-methylisoxazole.

References Cited in the file of this patent

UNITED STATES PATENTS 2,888,455    Kano _____ May 26, 1959

UNITED STATES PATENT OFFICE
CERTIFICATE OF CORRECTION

Patent No. 3,085,937                                April 16, 1963

Hisao Hirayama

It is hereby certified that error appears in the above numbered patent requiring correction and that the said Letters Patent should read as corrected below.

Columns 3 and 4, Table II, column 3 thereof should appear as shown below instead of as in the patent:

| Death |
|---|
| 3 birds on the 7th day, 1 bird on the 8th day. |
| – |
| – |
| – |
| – |
| – |
| – |

Signed and sealed this 25th day of February 1964.

(SEAL)
Attest:
ERNEST W. SWIDER
Attesting Officer

EDWIN L. REYNOLDS
Acting Commissioner of Patents